United States Patent Office 3,025,274
Patented Mar. 13, 1962

3,025,274
POLYMERS OF A VINYLPHENYL BORONIC COMPOUND
Walter M. Thomas, Noroton Heights, and Arthur K. Hoffmann, Stamford, Conn., assignors to American Cyanamid Company, New York, N.Y., a corporation of Maine
No Drawing. Filed Sept. 6, 1957, Ser. No. 682,316
15 Claims. (Cl. 260—80)

This invention relates to the production of new materials having valuable and characteristic properties that make them especially suitable for use in industry, for example in molding, coating, laminating, impregnating, textile-treating and adhesive applications, as neutron absorbers, gelling agents, metal-ion sequestering agents, and for other purposes. More particularly the invention is concerned with a polymer, specifically a linear polymer, of at least one vinylphenyl boronic compound selected from the class consisting of vinylphenyl boronic acids, and salts of vinylphenyl boronic acids. Vinylphenyl boronic acids of the kind with which this invention is concerned can be represented by the general formula I
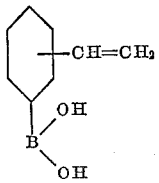

The term "a polymer" as used generically herein and in the appended claims with reference to a vinylphenyl boronic acid (and/or a salt thereof) includes within its meaning both homopolymers and copolymers of a vinylphenyl boronic acid, for instance copolymers of a vinylphenyl boronic acid with a compound which is different from the said boronic acid, is copolymerizable therewith and which contains a single $CH_2=C<$ grouping or a plurality of $CH_2=C<$ groupings, e.g., styrene, dimethyl styrene, methyl acrylate, methyl methacrylate, ethyl methacrylate, vinyl acetate, acrylonitrile, acrylamide, diallyl phthalate, triallyl citrate, tetrallyl silane, etc. The scope of the invention also includes method features whereby new and useful synthetic compositions are produced.

Compounds embraced by Formula I include the o-, m- and p-vinylphenyl boronic acids, and the term "a vinylphenyl boronic acid" as used generically herein and in the appended claims includes within its meaning both the pure or substantially pure isomers of vinylphenyl boronic acid, as well as any two or all three of the aforementioned isomers in any proportions.

(The phenyl radical represented, for purpose of simplicity, by the symbol

II

in Formula I also is frequently represented by the symbol

III

in order to indicate the aromatic unsaturation; and, hence, the latter symbol could be substituted, if desired, for the symbol used for the phenyl radical in Formula I.)

The polymers, especially the copolymers, of this invention are characterized, in general, by the fact that they are capable of undergoing reversible cross-linking; that is, the normally linear copolymers can be crosslinked, and the cross-linked polymers (by suitable treatment) can be converted into linear polymers. Furthermore, whereas most poly-(vinylphenyl) compounds, by which is meant specifically polystyrenes, have a softening point within the range of about 90° to 110° C., in marked contrast the homopolymeric vinylphenyl boronic acids of this invention do not soften below about 300° C.

It is one of the primary objects of the present invention to prepare a new class of polymers, including both homopolymers and copolymers, for use in industry.

Another object of the invention is to prepare linear polymers which are capable of undergoing reversible cross-linking.

Still another object of the invention is to prepare new boron-containing polymers.

Another object of the invention is to improve the usefulness of a vinylphenyl boronic acid whereby its field of utility is enhanced.

Other objects of the invention will be apparent to those skilled in the art from the following more detailed description.

Vinylphenyl boronic acids (including the salts thereof) are believed to be new chemical compounds. They are more fully described and are broadly and specifically claimed in the copending application of Arthur K. Hoffmann, Stephen J. Groszos and Walter M. Thomas, Serial No. 682,312, filed concurrently herewith, now Patent No. 2,934,556, dated April 26, 1960. A brief description of one method of preparation follows.

The o-, m- and p-vinylphenyl boronic acids (or mixtures of any two or all three of these isomers in any proportions) can be prepared by hydrating the corresponding vinylphenyl boroxole. The latter can be made by dehydrohalogenating, under anhydrous conditions and while admixed with a base, the corresponding alpha-X-ethylphenyl boroxole where X represents chlorine or bromine. Salts of a vinylphenyl boronic acid can be prepared by contacting the corresponding boronic acid (or the corresponding boroxole) with a base capable of forming a salt therewith, e.g., any of the alkali-metal hydroxides, or a strong, organic base, for instance, pentamethylguanidine, the strongly basic quaternary ammonium hydroxides including the various tetralkylammonium hydroxides (e.g., tetramethyl-, tetraethyl-, tetrapropylammonium hydroxides, etc.), the various tetralkanolammonium hydroxides (e.g., tetraethanolammonium hydroxide, tetrapropanolammonium hydroxide, tetrabutanolammonium hydroxide, etc.), the various benzyltrialkylammonium hydroxides (e.g., benzyltrimethylammonium hydroxide, benzyltriethylammonium hydroxide, etc.), and others that either will be apparent to those skilled in the art from the foregoing illustrative examples or can be ascertained by routine experimentation.

The objects of the invention are accomplished, in general, by polymerizing a vinylphenyl boronic acid alone or while admixed with one or more (e.g., two, three, five or any desired number) of other unsaturated substances which are copolymerizable therewith, examples of which have been given hereinbefore. The homopolymer or copolymer advantageously is produced, for instance, by polymerizing a vinylphenyl boronic acid or a mixture thereof with one or more other unsaturated materials and with the aid of a polymerization catalyst or catalysts, or a catalyst system, e.g., a "redox" (reduction-oxidation) catalyst system. In certain cases, for example when acrylonitrile is the unsaturated material that is copolymerized with the vinylphenyl boronic acid, the polymerization can advantageously be effected in an aqueous medium, with the aid of a polymerization catalyst or catalysts; and, at the end of the polymerization period, isolating the resulting copolymer.

Examples of monomers containing a $CH_2=C<$ grouping that can be copolymerized with a compound of the kind embraced by Formula I, which are different therefrom, and which can be polymerized either singly or with a plurality (two, three, four or any desired number) thereof, the latter often being desirable in order to improve the compatibility and copolymerization characteristics of the mixture of monomers and to obtain new and valuable copolymers having the particular properties desired for a particular service application, are such monomers as the unsaturated alcohol esters, more particularly the vinyl, isopropenyl, allyl, methallyl, crotyl, 1-chloroallyl, 2-chloroallyl, cinnamyl, 1-phenylallyl, butenyl, etc., esters of saturated and unsaturated, aliphatic and aromatic monobasic and polybasic acids such, for instance, as acetic, propionic, butyric, valeric, caproic, acrylic and alpha-substituted acrylic (including alkacrylic, e.g., methacrylic, ethacrylic, propacrylic, etc., and arylacrylic, e.g., phenylacrylic, etc.), crotonic, oxalic, malonic, succinic, glutaric, adipic, pimelic, suberic, azelaic, sebacic, fumaric, citraconic, mesaconic, itaconic, acetylene dicarboxylic, aconitic, benzoic, phenylacetic, phthalic, terephthalic, benzoylphthalic, etc., acids; the saturated monohydric alcohol esters, e.g., the methyl, ethyl, propyl, isopropyl, butyl, sec.-butyl, amyl, etc., esters of unsaturated aliphatic monobasic and polybasic acids, illustrative examples of which appear above; vinyl cyclic compounds (including monovinyl aromatic hydrocarbons), e.g., styrene, o-, m- and p-chlorostyrenes, -bromostyrenes, -fluorostyrenes, -methylstyrenes, -ethylstyrenes, -cyanostyrenes, the various poly-substituted styrenes such, for example, as the various di-, tri- and tetra-chlorostyrenes, -bromostyrenes, -fluorostyrenes, -methylstyrenes, -ethylstyrenes, -cyanostyrenes, etc., vinylnaphthalenes, vinylcyclohexanes, vinylfuranes, vinylpyridines, vinyldibenzofuran, divinylbenzenes, trivinylbenzenes, allylbenzenes, diallylbenzenes, N-vinyl carbazole, the various allyl cyanostyrenes, the various alpha-substituted styrenes and alpha-substituted ring-substituted styrenes, e.g., alpha-methyl styrene, alpha-methyl-paramethyl styrene, etc.; unsaturated ethers, e.g., ethyl vinyl ether, diallyl ether, ethyl methallyl ether, etc.; unsaturated acids and anhydrides, e.g., acrylic and methacrylic acids, maleic anhydride, etc.; unsaturated amides, for instance N-allyl caprolactam, acrylamide, and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc.; butadienes, e.g., 1,3-butadiene, 2-chlorobutadiene, etc.; unsaturated polyhydric alcohol (e.g., butenediol, etc.) esters of saturated and unsaturated, aliphatic and aromatic, monobasic and polybasic acids, illustrative examples of which appear above; unsaturated glycidyl esters such as glycidyl acrylate, glycidyl methacrylate, glycidyl itaconate, glycidyl allyl phthalate, etc.

Other examples of monomers that can be copolymerized with a vinylphenyl boronic acid to produce our new copolymer compositions are the vinyl halides, more particularly vinyl fluoride, vinyl chloride, vinyl bromide and vinyl iodide, and the various vinylidene compounds, including the vinylidene halides, e.g., vinylidene chloride, vinylidene bromide, vinylidene fluoride and vinylidene iodide, other comonomers being added if needed in order to improve the compatibility and copolymerization characteristics of the mixed monomers.

Other and more specific examples of monomeric materials which can be mixed or blended with a vinylphenyl boronic acid, and the resulting homogeneous or substantially homogeneous, polymerizable composition then polymerized, as hereinafter more fully described, to yield new and valuable copolymer compositions are the allyl compounds, especially those which have a boiling point of at least about 60° C. Of the monomeric materials which can be used the allyl esters form a large class, all of which are suitable. The reactive allyl compounds employed are preferably those which have a high boiling point such, for example, as diallyl maleate, diallyl fumarate, diallyl phthalate, diallyl succinate, etc. Other allyl compounds which are not necessarily high boiling also may be used.

More specific examples of allyl compounds that can be copolymerized with a vinylphenyl boronic acid are one or another or a plurality of the following (or a mixture thereof with another comonomer): allyl alcohol, methallyl alcohol, allyl acetate, allyl methacrylate, diallyl carbonate, allyl lactate, allyl alpha-hydroxyisobutyrate, allyl trichlorosilane, allyl acrylate, diallyl malonate, diallyl oxalate, diallyl gluconate, diallyl methylgluconate, diallyl adipate, diallyl azelate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate, triallyl phosphate, trimethallyl phosphate, tetrallyl silicate, hexallyl disiloxane, etc. Other examples of allyl compounds that may be employed are given in, for example, Kropa U.S. Patent No. 2,510,503 dated June 6, 1950.

Among the comonomers which are preferred for use in carrying our invention into effect are the vinyl compounds, including the vinyl aromatic compounds, more particularly the vinyl aromatic hydrocarbons (e.g., styrene, the various dialkyl styrenes, etc.), and the vinyl aliphatic compounds, e.g., acrylonitrile, acrylamide, etc., and other compounds containing a $CH_2=C<$ grouping, e.g., the various substituted acrylonitriles (e.g., methacrylonitrile, ethacrylonitrile, phenylacrylonitrile, etc.), the various substituted acrylamides (e.g., methacrylamide, ethacrylamide, the various N-substituted acrylamides and alkacrylamides, for instance N-methylol acrylamide, N-monoalkyl and -dialkyl acrylamides and methacrylamides, e.g., N-monomethyl, -ethyl, -propyl, -butyl, etc. and N-dimethyl, -ethyl, -propyl, -butyl, etc., acrylamides and methacrylamides, N-monoaryl and -diaryl acrylamides and alkacrylamides, e.g., N-monophenyl and -diphenyl acrylamides and methacrylamides, etc.), vinyl esters, e.g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e.g., methacrylic acid, ethacrylic acid, phenylacrylic acid, etc.), more particularly the alkyl esters of an acrylic acid, e.g., the methyl, ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids, including the alkyl acrylates containing not more than four carbon atoms in the alkyl grouping, examples of which are given above, as well as other vinyl aromatic and vinyl aliphatic compounds, and other compounds containing a $CH_2=C<$ grouping.

An unsaturated alkyd resin or a plurality of such resins also may constitute the unsaturated material which is copolymerized with one or more vinylphenyl boronic acids to produce new and valuable copolymer compositions. Such resins are reaction products of a polyhydric alcohol and an unsaturated polycarboxylic acid or anhydride, and they contain a plurality of polymerizably reactive alpha, beta-enal groups, that is, the grouping

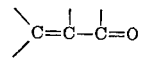

The unsaturated alkyd resins can be produced by various means, for example by the esterification of an unsaturated alpha,beta-polycarboxylic acid of the aliphatic series, more particularly an alpha,beta-unsaturated polycarboxylic acid, with a polyhydric alcohol, e.g., a glycol. The unsaturated alkyd resin employed as a co-reactant with a vinylphenyl boronic acid is preferably one having an acid number not greater than 50, although in some cases resins having an acid number as high as 100 may be employed. The term "unsaturated alkyd resin" as used herein does not include within its meaning the conventional drying oil or drying oil acid-modified alkyd resins in the preparation of which an aromatic or a saturated aliphatic polycarboxylic acid or anhydride is used.

Illustrative examples of unsaturated alkyd resins that may be employed are those produced by reaction of the following ingredients: ethylene glycol and maleic anhydride; glycerine and maleic anhydride; diethylene glycol, maleic anhydride and phthalic anhydride; diethylene glycol and itaconic acid; ethylene glycol, maleic anhydride and succinic acid; ethylene glycol, maleic anhydride and tetrafluorosuccinic acid; ethylene glycol, itaconic acid and phthalic anhydride; diethylene glycol, maleic anhydride and tung oil acids; ethylene glycol, maleic anhydride, linseed oil acids and phthalic anhydride; diethylene glycol and maleic anhydride; ethylene glycol, maleic anhydride and stearic acid; diethylene glycol, maleic anhydride and decyl alcohol; ethylene glycol, maleic anhydride, octyl alcohol and acetic anhydride; diethylene glycol, fumaric acid, tetrahydroabietyl alcohol and linseed oil fatty acids; alpha-propylene glycol and maleic anhydride; diethylene glycol, fumaric acid and benzyl alcohol; diethylene glycol, fumaric acid and tetrahydroabietyl alcohol; ethylene glycol, fumaric acid and omega-hydroxydecanoic acid; diethylene glycol, fumaric acid and linseed oil fatty acid monoglycerides; etc. Reference is made to the following patents for more detailed information regarding the ingredients, the preparation, and additional examples of modified and unmodified unsaturated alkyd resins that may be copolymerized with a vinylphenyl boronic acid to yield new synthetic compositions having a wide variety of commercial applications: 2,409,633; 2,443,740; 2,443,741; 2,485,294; and 2,510,503.

Mixtures of any of the aforementioned polymerizable materials may be copolymerized with a vinylphenyl boronic acid. For example, we may copolymerize a vinylphenyl boronic acid with an unsaturated alkyd resin alone, e.g., diethylene glycol maleate, etc., or, also alone, a compound containing a $CH_2=C<$ grouping (which compound is different from a vinylphenyl boronic acid), e.g., styrene, diallyl succinate, triallyl cyanurate, etc., or a mixture of such a resin and a compound containing a $CH_2=C<$ grouping. Mixtures of different unsaturated alkyd resins and of different compounds containing a $CH_2=C<$ grouping sometimes may be employed advantageously in making a copolymer thereof with a vinylphenyl boronic acid.

Graft polymers of a vinylphenyl boronic acid and a co-reactable substance are embraced by the term "copolymer" as used broadly herein and in the appended claims with reference to a vinylphenyl boronic acid. The vinylphenyl boronic acid may be grafted to a polymer of a different polymerizable substance, e.g., polystyrenes, polyacrylonitriles or polymers of other monomers that contain a $CH_2=C<$ grouping, numerous examples of which have been given hereinbefore; or the backbone of the polymer chain may be a linear polymer of a vinylphenyl boronic acid to which is grafted a co-reactive unsaturated material such as styrene, acrylonitrile or other monomer containing a $CH_2=C<$ grouping, including any of those mentioned hereinbefore by way of example.

In the production of copolymers, the vinylphenyl boronic acid generally constitutes at least about 3% by weight of the mixture of copolymerizable materials, e.g., from 5% or 10% to 90% or 95%, or even as high as 98% or 99% by weight of the aforesaid mixture. The smaller proportions are generally employed when it is desired to impart a specific property or characteristic to the copolymer. For example, in the case of the acrylonitrile copolymers, improved dye-receptivity is imparted to the copolymer and to fibers produced therefrom by copolymerizing ingredients including acrylonitrile and a vinylphenyl boronic acid in proportions such that the copolymer contains, by weight, from about 1% to about 10% by weight of vinylphenyl boronic acid combined in the copolymer molecule.

Any suitable means may be employed in effecting polymerization of a vinylphenyl boronic acid alone or admixed with one or more other unsaturated substances which are copolymerizable therewith. Although the vinylphenyl boronic acids are normally solids (i.e., solids at room temperature), they are capable of being polymerized with varying degrees of ease by, for example, a cationic initiator or catalyst (e.g., boron trifluoride-ethyl etherate), or by an anionic initiator or catalyst (e.g., a sodium-naphthalene complex, metallic sodium, etc.), or by a free-radical initiator or catalyst (e.g., benzoyl peroxide or other organic peroxy compound, or an azo catalyst such, for instance, as alpha,alpha'-azodiisobutyronitrile). Various redox catalyst systems also can be used advantageously in many instances. Examples of such systems are the chloric acid-sulfurous acid system derived from, for instance, sodium chlorate and sodium sulfite; a system derived from the use of ammonium persulfate and sodium metabisulfite; and others such as are disclosed in, for example, Thomas U.S. Patent No. 2,718,515 dated September 20, 1955, column 3, lines 5–44.

Additional examples of peroxy type of free-radical catalysts are the various organic peroxy catalysts, illustrative examples of which latter are: the dialkyl peroxides, e.g., dipropyl peroxide, dibutyl peroxide, dilauryl peroxide, dioleyl peroxide, distearyl peroxide, di-(tert.-butyl) peroxide and di-(tert.-amyl) peroxide; the alkyl hydrogen peroxides, e.g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e.g., coconut oil acid peroxides, etc.; unsymmetrical or mixed diacyl peroxides, e.g., acetyl benzoyl peroxide, propionyl benzoyl peroxide, etc.; terpene oxides, e.g., ascaridole, etc.; urea peroxide; the various percarboxylic acids; the various percarbonates, persulfates, perborates, etc.; and others that will be apparent to those skilled in the art from the foregoing examples.

Additional examples of azo type of free-radical catalysts include the following:

Dimethyl alpha,alpha'-azodiisobutyrate
Alpha,alpha'-Azobis (alpha-methylbutyronitrile)
Alpha,alpha'-Azobis (alpha-ethylbutyronitrile)
Alpha,alpha'-Azobis (alpha,gamma-dimethylvaleronitrile)
Alpha,alpha'-Azobis (alpha-methylvaleronitrile)
Alpha,alpha'-Azobis (alpha-methylcapronitrile)
Alpha,alpha'-Azobis (alpha-n-butylcapronitrile)
Alpha,alpha' - Azobis (alpha - isobutyl - gamma - methylvaleronitrile)
Alpha,alpha' - Azobis (alpha - isopropyl - beta - methylbutyronitrile)
Alpha,alpha'-Azobis (alpha,beta-dimethylbutyronitrile)
Alpha,alpha'-Azobis (alpha,gamma-dimethylcapronitrile)
1,1'-azodicyclopentanecarbonitrile Reference is made to Hunt U.S. Patent No. 2,471,959 dated May 31, 1949 for additional examples and for a generic description of compounds of this class.

In addition to free-radical catalysts of the above types or kinds, ionizing radiations, ultraviolet light, etc., may also be used to initiate polymerization.

Additional examples of ionic catalysts that can be used are p-toluene sulfonic acid, sulfuric acid, phosphoric acid, aluminum chloride, stannic chloride, titanium tetrachloride, boron trifluoride and other Lewis-type catalysts, more particularly Friedel-Craft catalysts; and the various anionic catalysts, e.g., metallic potassium, a potassium-naphthalene complex, amylsodium, amylpotassium, etc.

The monomeric vinylphenyl boronic acid or mixture of copolymerizable ingredients can be polymerized in emulsion or in solution state to yield a homopolymer or a copolymer. Water can be the liquid medium in which the monomer or mixture of monomers is homopolymerized or copolymerized. Various inert organic solvents or diluents also may be employed, the choice depending upon the particular comonomer and catalyst used and among which may be mentioned: benzene, toluene, xylene, dioxane, ethers (e.g., dibutyl ether), esters (e.g., butyl acetate), chlorobenzene, chloroform, carbon tetrachloride, methylene chloride, ethylene dichloride, ketones (e.g., methyl ethyl ketone), tertiary alcohols, for instance tertiary-butyl alcohol, tertiary-amyl alcohol, tertiary-hexyl alcohol, as well as others. When the reaction is effected in solution state, a temperature at or approaching the boiling temperature of the solution may be used if desired. The homopolymer or copolymer is then separated from the liquid medium (solvent or diluent) in which polymerization was effected by any suitable means, e.g., by filtration, centrifuging, solvent extraction, evaporation of the solvent or diluent, etc.

The polymerization can be effected continuously, semi-continuously or by a batch operation. Bulk or mass polymerization technique can be used; or polymerization can be effected in a solvent which is capable of dissolving the polymerizable substance and in which the latter is preferably inert; or in a liquid medium in which the polymerizable substance is soluble but the homopolymer or copolymer is insoluble; or by bead polymerization technique. The polymerization can be effected at atmospheric or at superatmospheric pressures, as desired or as conditions may require.

As indicated hereinbefore, a catalyst or catalytic influence is required in order to initiate the polymerization or if polymerization is to be effected in a reasonable or practical period of time. The concentration of catalyst employed varies considerably. Thus, depending upon the particular catalyst used and the kind and amount (if any) of copolymerizable substance that is being copolymerized with the vinylphenyl boronic acid, it may range from, for example, about 0.5 part or 1 part by weight of catalyst per thousand parts by weight of the polymerizable substance to a molar ratio of catalyst/polymerizable substance equal to or greater than 1.

In this connection it may be mentioned that some striking differences have been observed in the free radical-initiated and the cationic-initiated polymerization of a vinylphenyl boronic acid. In general, a much smaller quantity of a free-radical initiator than of a cationic initiator is required to induce polymerization. Thus, in the case of the polymerization of p-vinylphenyl boronic acid in chloroform solution, less than a molar ratio of BF$_3$-etherate/monomer resulted in incomplete polymerization after 8 days at room temperature, as evidenced by the fact that a sample of the supernatant solution gelled when treated with a molar excess of boron trifluoride etherate. In marked contrast to the rate of polymerization by boron trifluoride etherate at a catalyst/monomer ratio of less than 1:1, an aqueous solution of p-vinylphenyl boronic acid is rapidly polymerized at 85°–90° C. with ammonium persulfate (a free-radical initiator), using a mole ratio of ammonium persulfate/monomer as low as 0.03 to 1.0. Homopolymeric p-vinylphenyl boronic acid obtained by this means is partially soluble in aqueous sodium hydroxide solution, the major portion being insoluble but swollen to a gel. The insolubility and the gel formation in aqueous sodium hydroxide solution of a large portion of the homopolymeric p-vinylphenyl boronic acid strongly suggests that during the polymerization reaction, using a persulfate initiator or catalyst, a significant amount of cross-linking has occurred. In opposition to cross-linking through boron-oxygen bonds, this type of cross-linking involves carbon-carbon bonds; and this cross-linked polymer cannot be hydrolyzed in aqueous alkali to yield a soluble polymer. Polymers that are cross-linked by boron-oxygen bonds may, however, be hydrolyzed by aqueous alkali to form a soluble polymer.

The temperature of polymerization of the polymerizable substance or composition, at atmospheric or superatmospheric pressure, and under a catalytic influence such as that provided by an added polymerization initiator, can be varied over a wide range up to and including or slightly above the boiling point (at atmospheric pressure) of the mass (or of the lowest boiling component thereof), but should be below the decomposition temperature of the monomeric material or materials (i.e., the polymerizable composition). In most cases the polymerization temperature will be within the range of 15° C. to 150° C., more particularly within the range of 20°–30° C. (ordinary room temperature) to about 130° C., depending upon the particular polymerizable composition being polymerized, the particular catalyst used, the rapidity of polymerization wanted, and other influencing factors. With certain ionic catalysts, e.g., gaseous BF$_3$, a boron trifluoride-ethyl ether complex, concentrated sulfuric acid, anhydrous aluminum chloride, etc., a substantially lower polymerization temperature often advantageously may be used, e.g., temperatures ranging between —80° C. and 0° C. or +10° C. At the lower temperatures below the solidification point of the monomeric vinylphenyl boronic acid or of the mixture thereof with one or more other polymerizable substances, polymerization is usually effected while the polymerizable composition is dissolved or dispersed in a solvent or dispersion medium which is liquid at the polymerization temperature. The polymeric material is then separated from the liquid medium in which polymerization was effected by any suitable means, for example by techniques such as those mentioned hereinbefore for purposes of illustration.

In order that those skilled in the art may better understand how the preesnt invention can be carried into effect, the following examples are given by way of illustration and not by way of limitation. All parts and percentages are by weight unless otherwise stated.

*Example 1*

Ten (10) g. of p-vinylphenyl boronic acid is dissolved in 500 ml. of water and the pH is adjusted to about 8.0 with aqueous sodium hydroxide. Heating this solution in the presence of 20 ml. of a 2% aqueous solution of ammonium persulfate and 15 ml. of a 1% aqueous soluiton of sodium thiosulfate at 85°–90° C. for 1 hour gives a white suspension of polymer. The solid is centrifuged, and the isolated solid has a melting point greater than 300° C. Polymerization under these conditions affords not only linear polymer but also cross-linked polymer because the reaction product is not totally soluble in aqueous alkali. The insoluble polymer is swollen to a gel in the alkaline solution.

*Example 2*

Same as in Example 1 with the exception that o-vinylphenyl boronic acid is employed. Similar results are obtained.

*Example 3*

Twenty (20) g. of p-vinylphenyl boronic acid is placed in 2500 ml. of water, and 15 ml. of 1 molar aqueous sodium hydroxide solution is added. One hundred and twenty (120) ml. of 2% aqueous ammonium persulfate and 60 ml. of 1% aqueous sodium thiosulfate are then added and the solution is heated at 60° C. for 65 hours. At the end of the reaction time the reaction mass is acidified and centrifuged. The polymer which is obtained from this reaction is linear, and is completely soluble in aqueous alkali; its melting point after drying is greater than 300° C.

The isolated polymer can be used as, for example, a neutron absorber or as a gelling agent. It also can be employed as the backbone upon which other monomers, e.g., styrene, acrylonitrile, etc., can be grafted to provide a new class of graft polymers.

*Example 4*

Five (5) g. of o-vinylphenyl boronic acid (M.P.: sinters 83°–85° C., liquefies 99°–101° C., D.) is dissolved in 20 ml. of hot water, and the pH is adjusted to about 8.0 with aqueous sodium hydroxide solution. Two (2) ml. of 2% aqueous ammonium persulfate solution and 1 ml. of 1% aqueous sodium thiosulfate solution are added, and the solution is maintained at 90–95° C. for 15 minutes. At the end of this time, a hard solid precipitates. The solution is brought to neutrality with hydrochloric acid and the homopolymer is separated by filtration. The isolated polymer is dried in an oven at 100° C., and is obtained in a yield corresponding to theory. It has a melting point greater than 300° C., with slight darkening at a temperature above 250° C.

Instead of o- or p-vinylphenyl boronic acid in the above examples one can use m-vinylphenyl boronic acid, or a mixture of any or all of these isomers in any proportions.

The following example illustrates the preparation of a copolymer of acrylonitrile and p-vinylphenyl boronic acid, M.P. 179°–182° C. (same as in all examples herein where used).

*Example 5*

Solution 1.—20 g. of water, 6 mg. of sodium bicarbonate and 121 mg. of an emulsifying agent, specifically the bis-sulfosuccinic ester of methylpentyl alcohol.

Solution 2.—5 g. of water, 5 mg. of ammonium persulfate.

Solution 3.—0.7693 g. ($5.2 \times 10^{-3}$ mole) of p-vinylphenyl boronic acid dissolved in 3.3895 g. (0.064 mole) of moist acrylonitrile.

Solution 1 is placed in a 3-necked flask fitted with a reflux condenser, stirrer and dropping funnel. The flask is placed in a 95° C. bath and 0.05 ml. of Solution 2 is added through the reflux condenser. Monomer Solution 3 is added dropwise over a period of ½ hour. Solution 2 is added dropwise during the course of reaction in a manner such that 0.05 ml. remains after the addition of monomer is complete. This remaining solution is then added all at once and the mixture maintained at 90° C. for an additional half hour. Aqueous hydrochloric acid is added at the end of this time to break the emulsion. The gummy, precipitated copolymer is purified by solution in dimethylformamide, reprecipitation from water, drying, powdering and re-washing with water. The dried copolymer has a melting point greater than 300° C.

The acrylonitrile-p-vinylphenyl boronic acid copolymer of this example can be wet-spun or dry-spun into fibers by any of the procedures known to the art, yielding fibers that have improved dye-receptivity as compared with fibers made from homopolymeric acrylonitrile or many of the known fiber-forming (fiber-formable) copolymers of acrylonitrile.

Similar results are obtained when o- or m-vinylphenyl boronic acid is substituted for p-vinylphenyl boronic acid in the above example or when one uses a mixture of any of the isomers of vinylphenyl boronic acid in any proportions.

*Example 6*

A copolymer of p-vinylphenyl boronic acid and styrene is prepared as follows from di-n-butyl(p-vinylphenyl)-boronate and styrene.

Di-n-butyl(p-vinylphenyl)boronate (29.5 g.) and 3.57 g. styrene are reacted together at room temperature about 20°–30° C.) in 30 ml. of tetrahydrofuran, using about 200 mg. metallic sodium in the form of an emulsion in toluene) as an anionic initiator. The resulting copolymer is soluble in methanol. It is purified by washing with n-hexane and hot water, the latter hydrolyzing the initial copolymer of di-n-butyl(p-vinylphenyl)boronate and styrene to a copolymer of p-vinylphenyl boronic acid and styrene.

The resulting linear copolymer, which has a melting point of 186° C., is heated to 250°–300° C. Water is eliminated and the polymeric mass becomes yellow. The residue, after heating, is only partly soluble in methanol. The insoluble portion is washed with toluene, whereupon the yellow color disappears and the polymer becomes white again. Its melting point, after drying, is greater than 300° C. The results of the test indicate that cross-linking in the polymer molecule has occurred by reformation of boroxole units. The polymer, although insoluble in organic or aqueous organic solvents, is soluble in aqueous sodium hydroxide.

From the foregoing it will be seen that the present invention provides a method of cross-linking a linear polymer of a vinylphenyl boronic acid which comprises heating said linear polymer until sufficient water has been evolved therefrom to effect the desired degree of cross-linking.

Dyes, pigments, opacifiers, lubricants, plasticizers, fillers and other effect agents can be incorporated into the linear (non-cross-linked) copolymer of this example to provide molding compositions from which can be produced molded articles suitable for a wide variety of industrial and domestic applications.

*Example 7*

|  | Parts |
|---|---|
| p-Vinylphenyl boronic acid | 20.0 |
| Ethyl acrylate | 30.0 |
| n-Propyl acetate | 50.0 |
| Benzoyl peroxide | 0.5 |
| Water | 3.0 | are heated together under reflux at the boiling temperature of the mass for 5 hours. The resulting viscous mass containing a copolymer of ethyl acrylate and the aforementioned vinylphenyl boronic acid is cooled, and precipitated with methanol. Films dried from an aqueous tert.-butanolic solution of the copolymer are tough. The copolymer of this example is suitable for use as a component of coating compositions.

Instead of ethyl acrylate other comonomers, more particularly other esters of acrylic acid, e.g., methyl acrylate, propyl acrylate, isopropyl acrylate, n-butyl acrylate, isobutyl acrylate, sec.-butyl acrylate, tert.-butyl acrylate, amyl acrylate, hexyl acrylate, propenyl acrylate, cyclohexyl acrylate, phenyl acrylate, benzyl acrylate, etc., can be substituted in the above formulation thereby to obtain copolymer compositions of varying properties. As with ethyl acrylate, so too with such other comonomers the proportions of components can be varied as desired or as conditions may require, e.g., from 3 to 97 (or higher) molar percent of the p-vinylphenyl boronic acid to from 97 to 3 (or lower) molar percent of the other comonomer.

*Example 8*

Styrene (9.0 g.), p-vinylphenyl boronic acid (1.0 g.) and chlorobenzene (50 g.) are heated to 80° C., and 0.01 g. alpha,alpha'-azodiisobutyronitrile dissolved in 1.0 g. chlorobenzene is added. The mixture is heated for 4 hours at 80° C. The solution is then poured into 100 ml. of cold methanol, and the resulting copolymer of styrene and p-vinylphenyl boronic acid is removed by filtration, washed and dried. The dried copolymer, alone or with a dye, pigment, filler, plasticizer, lubricant, or other modifying agent, may be molded under heat and pressure, e.g., at 140° C. to 170° C. and under a pressure of 2000 to 5000 pounds per square inch.

The copolymer of this example, in solution in, for example, methyl ethyl ketone, may be used as a coating composition or as a component of such compositions.

For example, it may be applied to a surface of glass, metal, wood or other material to be protectively finished, and the coated article then heated for from 1 to 3 hours at a temperature of the order of 100° C. to 120° C. to evaporate the solvent and to solidify the coating thereon.

*Example 9*

A two-liter, 3-necked vessel is fitted with a condenser, stirrer, nitrogen-inlet tube and a dropping funnel, and is supported on a water bath maintained at 50° C. A solution of 0.029 g. sulfuric acid in 900 ml. of distilled water is placed in the vessel, and nitrogen gas is bubbled through for 20 minutes. Next, 50 g. of acrylonitrile and 3 g. of p-vinylphenyl boronic acid are added, followed by 1.71 g. $(NH_4)_2S_2O_8$ in 50 ml. of water and 0.71 g. $Na_2S_2O_5$ in 50 ml. of water. After 4 hours the copolymer of acrylonitrile and p-vinylphenyl boronic acid that forms is separated by filtration on a Büchner funnel, and is washed with 2 liters of deionized water. The washed copolymer is dried for about 16 hours in a forced draft oven at 60° C. It is suitable for use in making fibers.

*Example 10*

Acrylamide (47.5 g.), p-vinylphenyl boronic acid (2.5 g.), demineralized water (440 ml.), isopropyl alcohol (10 ml.) and ammonium persulfate (0.15 g.) are heated to 70° C. under a blanket of nitrogen. This temperature is maintained for 2 hours, giving a clear, viscous solution comprising a copolymer of acrylamide and p-vinylphenyl boronic acid. This solution can be used as such in textile sizing, adhesive and other applications, or it can be dried to yield a brittle copolymeric product.

*Example 11*

| | Parts |
|---|---|
| o-Vinylphenyl boronic acid | 2.5 |
| Methyl acrylate | 2.5 |
| Methyl methacrylate | 22.5 |
| Alpha,alpha'-azodiisobutyronitrile | 2.0 | are mixed together and charged to a heavy-walled glass tube, which thereafter is sealed under vacuum. Copolymerization is effected by heating the sealed tube in an 80° C. water bath for 60 hours and then in an oil bath as follows: 24 hours each at 100° C., 120° C., 135° C. and 150° C. The resulting copolymer can be molded under heat and pressure to yield a wide variety of molded articles for domestic and industrial uses.

*Example 12*

Ethyl acetate is saturated with water at room temperature and 100 g. of the wet ester is used as a solvent for 1.0 g. of methyl methacrylate, 9.0 g. of p-vinylphenyl boronic acid and 0.05 g. of benzoyl peroxide. The mixture is stirred in an oxygen-free atmosphere for 6 hours at 65° C. The copolymer of methyl methacrylate and p-vinylphenyl boronic acid that forms is recovered by pouring the reaction mass into a large excess of rapidly stirred methanol, separating the precipitated copolymer by filtration, washing with methanol and drying at 40° C. The dried copolymer can be used in molding, coating, adhesive and other compositions.

*Example 13*

| | Parts |
|---|---|
| p-Vinylphenyl boronic acid | 5.0 |
| Vinylidene chloride | 145.0 |
| α,α'-azodiisobutyronitrile | 1.5 | are mixed and heated together in a closed vessel for 24 hours at 40° C., and for another 24 hours at 60° C., yielding a solid, thermoplastic copolymer of vinylidene chloride and the said vinylphenyl boronic acid. This copolymer can be hot drawn to obtain monofilaments, rods, bars, tubes, etc., having a wide variety of commercial uses.

*Example 14*

One hundred (100) grams of acrylamide, 10 grams of o-vinylphenyl boronic acid and 10 ml. of 30% hydrogen peroxide are added to 500 ml. of distilled water. The polymerization of the mixture is carried out at 60° C. for 48 hours. The water-soluble copolymer which forms is precipitated by pouring the reaction mass into methanol. The resinous product is washed with methanol and dried.

Instead of acrylamide, an equivalent amount of methacrylamide can be substituted to obtain the corresponding resinous methacrylamide copolymer.

The above copolymers, and especially their formaldehyde-reaction products, are particularly useful in textile-sizing, adhesive, paper-treating, soil-conditioning and soil-stabilization compositions and applications.

*Example 15*

| | Parts |
|---|---|
| p-Vinylphenyl boronic acid | 100.0 |
| Vinyl acetate | 100.0 |
| Methyl ethyl ketone | 200.0 |
| α,α'-azodiisobutyronitrile | 0.2 |

The homogeneous solution of the above comonomers is refluxed for 6 hours. At the end of this time the solvent and unreacted vinyl acetate are removed by vacuum evaporation. A solid copolymeric mass is obtained.

*Example 16*

Same as in Example 15 with the exception that 50 parts methyl acrylate and 50 parts ethyl acrylate are substituted for 100 parts of vinyl acetate. Similar results are obtained.

*Example 17*

Same as in Example 16 with the exception that the polymerization is initiated by 250 KV-peak X-rays from a General Electric Maxitron tube operated at 30 milliamperes. After 5 hours' irradiation, a gummy solid copolymer is obtained.

*Example 18*

A mixture of 10 g. p-vinylphenyl boronic acid, 10 g. p-cyanostyrene, 50 g. xylene and 0.20 g. di-tert.-butyl peroxide is heated to 130° C. over a period of 1 hour. The mixture is kept at this temperature for a total of 2 hours. A copolymer of p-vinylphenyl boronic acid and p-cyanostyrene precipitates from the xylene as it forms. The copolymer is removed by filtration and washed with hot xylene. The dried copolymer is insoluble in common organic liquids, but swells in aqueous ketones, alcohols and esters.

*Example 19*

A spinning solution is prepared by dissolving 50 parts of an acrylonitrile copolymer (obtained by polymerizing a mixture of 95% acrylonitrile and 5% p-vinylphenyl boronic acid (prepared as described under Example 9) in an amount of a concentrated aqueous solution of sodium thiocyanate (about 49% NaSCN in water) such that the concentration of copolymer in this solution is about 10%. The resulting solution is filtered, placed under vacuum and allowed to deaerate for 3 days.

The spinning solution thereby obtained is spun into a fiber by extruding it through a spinnerette having 45 holes, each 75 microns in diameter, into a coagulating bath comprising water maintained at a temperature of about 0° C. The freshly spun fiber in gel state is continuously passed over a pair of converging wash rolls while it is advancing in a helical path. The fiber is rinsed with water on the rolls to remove excess thiocyanate. The washed fiber is stretched 820%, for example by passing it through a bath of hot water maintained at a temperature of about 99.5° C., followed by drying on converging drying rolls while it is moving in a helical path toward the take-off end as is more fully described in Cresswell et al. U.S. Patent No. 2,558,733.

The dried fiber has better dye-receptivity than a fiber which has been similarly prepared from homopolymeric acrylonitrile.

*Example 20*

Example 19 is repeated using, instead of the two-component copolymer of that example, a ternary polymer obtained by polymerizing a mixture of 90% acrylonitrile, 5% 2-methyl-5-vinylpyridine and 5% p-vinylphenyl boronic acid, following the same general procedure employed in making the two-component copolymer of Example 9. The resulting fiber has better dyeability, especially toward acid dyes, than the fiber of Example 19 or than a fiber similarly produced from homopolymeric acrylonitrile.

*Example 21*

Thirty (30) parts of ethylene glycol fumarate sebacate (4:3:1 molar ratio) are mixed with 0.5 part of p-vinylphenyl boronic acid and 9.5 parts of styrene. To 12 parts of the resulting mixture are added 8 parts of wood flour filler and 2 parts of benzoyl peroxide containing 50% inactive filler (triphenyl phosphate). The resulting mixture is compacted by passage through cold rolls and disintegrated, and this composition then placed in a disk mold preheated to 140° C. and left there under a pressure of about 3,000 pounds per square inch for about 20 minutes. The resulting molding is hard and well-cured.

*Example 22*

A uniform mixture of 25 parts of ethylene glycol fumarate sebacate (4:3:1 molar ratio), 0.5 part of p-vinylphenyl boronic acid and 9.5 parts of styrene containing 0.4 part of benzoyl peroxide is spread evenly between five plies of ECC-11-112 Fiberglas cloth and the combination is held under slight pressure in a Carver press for about 40 minutes at about 150° C. The resinous copolymer component of the impregnated Fiberglas cloth becomes hard and the panel stiff.

*Example 23*

The resin mixture of Example 22 is spread evenly between six plies of No. 720 paper, and the combination is subjected to the same curing conditions as the Fiberglas laminate of Example 22. The resulting panel is stiff, and the paper laminate is well cured.

*Example 24*

Sixty-seven (67) parts of diethylene glycol fumarate sebacate (6:5:1 molar ratio), 5.0 parts of o-vinylphenyl boronic acid, 28 parts of allyl phthalate, 7 parts of paraformaldehyde and 0.5 part of benzoyl peroxide containing 50% inactive filler (triphenyl phosphate) are thoroughly mixed together in a suitable vessel and then heated at 100° C. A vigorous reaction occurs, accompanied by evolution of gas. As the mass polymerizes and sets, it undergoes about a two-fold expansion and the cured mass is porous.

It will be understood, of course, by those skilled in the art that our invention is not limited to the specific ingredients named in the above illustrative examples nor to the particular proportions and methods of polymerization and copolymerization mentioned therein. For example, in place of the particular isomer of vinylphenyl boronic acid specified in the individual example we may use any other isomer of said acid or mixtures thereof in any proportions. Also, in place of all or part of the particular co-reactant named in the individual example one can use other compounds containing a $CH_2=C<$ grouping and/or an unsaturated alkyd resin, numerous examples of which have been given hereinbefore.

The polymerization products (polymers and copolymers) of this invention have a wide variety of applications. For instance, with or without a filler or other additive, numerous examples of which have been given hereinbefore, they may be used as molding compositions (or as components of molding compositions) from which molded articles are produced by molding the composition under heat and pressure, e.g., at temperatures of the order of 120° to 200° C. and under pressures ranging between 1,000 and 10,000 pounds per square inch. Among the fillers that can be employed in the production of molding compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable compositions used in producing the polymers of our invention also can be used in the production of castings; as adhesives, for instance as binders for paper, glass, wood, rubber, etc., or in the production of optical devices containing a plurality of elements, examples of which are compound lenses, compound prisms, Nicol prisms, etc.; in the treatment of paper or paper stock; and for various other purposes including those mentioned in some of the specific examples, and in the portion of this specification prior to the examples.

We claim:

1. A polymer of at least one vinylphenyl boronic compound selected from the class consisting of vinylphenyl boronic acids represented by the general formula

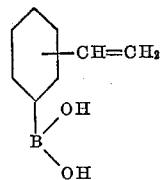

and salts of the aforesaid vinylphenyl boronic acids.

2. A linear polymer of at least one vinylphenyl boronic compound selected from the class consisting of vinylphenyl boronic acids represented by the general formula

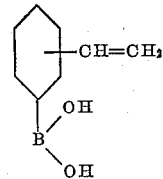

and salts of the aforesaid vinylphenyl boronic acids.

3. The method of cross-linking a linear polymer of at least one vinylphenyl boronic compound selected from the class consisting of vinylphenyl boronic acids represented by the general formula

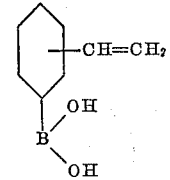

and salts of the aforesaid vinylphenyl boronic acids, said method comprising heating said linear polymer until sufficient water has been evolved therefrom to effect the desired degree of cross-linking.

4. A homopolymer of a vinylphenyl boronic acid represented by the general formula

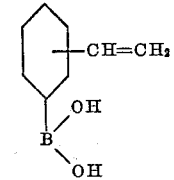

5. Homopolymeric p-vinylphenyl boronic acid.

6. A composition comprising a copolymer of copolymerizable ingredients including (1) at least one vinylphenyl boronic compound selected from the class consisting of vinylphenyl boronic acids represented by the general formula

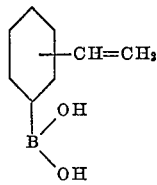

and salts of the aforesaid vinylphenyl boronic acids, and (2) a compound which is different from the boronic compound of (1), which is copolymerizable therewith and which contains a $CH_2\!=\!C\!<$ grouping.

7. The method of preparing a new synthetic material which comprises polymerizing, with the aid of a catalyst selected from the class consisting of free-radical polymerization catalysts and ionic polymerization catalysts, at least one vinylphenyl boronic compound selected from the class consisting of vinylphenyl boronic acids represented by the general formula

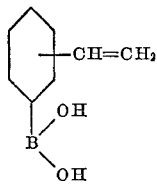

and salts of the aforesaid vinylphenyl boronic acids.

8. A linear polymer of at least one vinylphenyl boronic compound selected from the class consisting of vinylphenyl boronic acids represented by the general formula

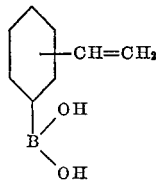

and salts of the aforesaid vinylphenyl boronic acids, said linear polymer being capable of undergoing reversible cross-linking.

9. A cross-linked polymer of at least one vinylphenyl boronic compound selected from the class consisting of vinylphenyl boronic acids represented by the general formula

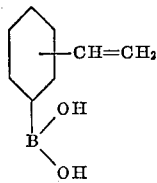

and salts of the aforesaid vinylphenyl boronic acids, said cross-linked polymer being convertible into a linear polymer.

10. A composition comprising a linear copolymer of copolymerizable ingredients including (1) at least one vinylphenyl boronic compound selected from the class consisting of vinylphenyl boronic acids represented by the general formula

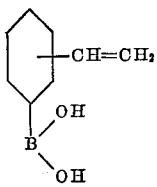

and salts of the aforesaid vinylphenyl boronic acids, and (2) a compound which is different from the boronic compound of (1), which is copolymerizable therewith and which contains a $CH_2\!=\!C\!<$ grouping, said linear copolymer being capable of undergoing reversible cross-linking.

11. A composition comprising a cross-linked copolymer of copolymerizable ingredients including (1) at least one vinylphenyl boronic compound selected from the class consisting of vinylphenyl boronic acids represented by the general formula

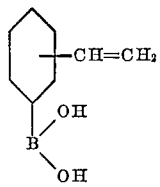

and salts of the aforesaid vinylphenyl boronic acids, and (2) a compound which is different from the boronic compound of (1), which is copolymerizable therewith and which contains a $CH_2\!=\!C\!<$ grouping, said cross-linked copolymer being convertible into a linear copolymer.

12. A composition comprising a copolymer of copolymerizable ingredients including (1) at least one vinylphenyl boronic compound selected from the class consisting of vinylphenyl boronic acids represented by the general formula

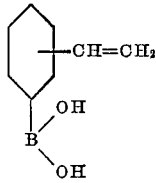

and (2) a vinyl aliphatic compound.

13. A composition comprising a copolymer of copolymerizable ingredients including (1) at least one vinylphenyl boronic compound selected from the class consisting of vinylphenyl boronic acids represented by the general formula

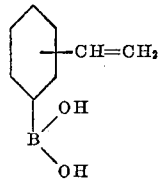

and (2) acrylonitrile.

14. A composition comprising a copolymer of copolymerizable ingredients including (1) at least one vinylphenyl boronic compound selected from the class consisting of vinylphenyl boronic acids represented by the general formula

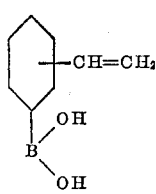

and (2) a vinyl aromatic compound.

15. A composition comprising a copolymer of copolymerizable ingredients including (1) at least one vinylphenyl boronic compound selected from the class consisting of vinylphenyl boronic acids represented by the general formula
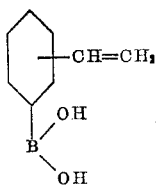
and (2) styrene.
References Cited in the file of this patent
UNITED STATES PATENTS
| | | | |
|---|---|---|---|
| 2,273,891 | Pollack et al. | | Feb. 24, 1942 |
| 2,318,959 | Muskat et al. | | May 11, 1943 |
| 2,934,556 | Hoffmann et al. | | Apr. 26, 1960 |
OTHER REFERENCES
J. Soc. Chem. Ind., Japan, 46, p. 126 (briefed in 44 Chem. Abstracts 9187h (1950).

UNITED STATES PATENT OFFICE
CERTIFICATE OF CORRECTION

Patent No. 3,025,274                                   March 13, 1962

Walter M. Thomas et al.

It is hereby certified that error appears in the above numbered patent requiring correction and that the said Letters Patent should read as corrected below.

Column 9, line 40, for "flash" read -- flask --; line 74, before "about" insert an opening parenthesis; line 75, before "in" insert an opening parenthesis; column 13, line 50, for "allyl" read -- diallyl --.

Signed and sealed this 10th day of July 1962.

(SEAL)
Attest:

ERNEST W. SWIDER
Attesting Officer

DAVID L. LADD
Commissioner of Patents